United States Patent Office

3,379,794
Patented Apr. 23, 1968

3,379,794
BLENDS OF FIBER FORMING ACRYLONITRILE POLYMERS AND POLYMERIC 2,2-DISUBSTITUTED PROPIOLACTONE
Charles King and Frederick Theodore Wallenberger, Wilmington, Del., assignors to E. I. du Pont de Nemours and Company, Wilmington, Del., a corporation of Delaware
No Drawing. Filed Apr. 27, 1966, Ser. No. 545,545
7 Claims. (Cl. 260—898)

ABSTRACT OF THE DISCLOSURE

This invention relates to new polymeric compositions derived from acrylonitrile which are blends of a fiber forming acrylonitrile polymer and a polymeric 2,2-disubstituted propiolactone. The fibers exhibit enhanced recovery and improved modulus when hot and wet.

---

This invention relates to new polymeric compositions derived from acrylonitrile. More specifically, the invention relates to acrylonitrile polymer compositions from which fibers can be made exhibiting markedly enhanced physical properties in the hot, wet state. This invention further relates to novel processes of making the novel polymeric compositions derived from acrylonitrile.

Despite wide commercial success of fibers of acrylonitrile polymer, the physical properties of the fibers are quite poor when they are in contact with hot water, and this deficiency has restricted their application for many uses. For example, the fibers are easily stretched out of shape when they are subjected to tension in a hot dye bath, or deformed when processed in the presence of steam, owing to the low modulus of the fibers when hot and wet. Fabrics made of the fibers are easily wrinkled, owing to the low recovery exhibited by the fibers. There has been a strong incentive to improve these properties of the fibers, providing that the improvement could be achieved without impairment of other desirable properties of the fiber, but such a result has not been realized from the various chemical and physical modifications of the fiber structure which have been tried hitherto.

It has now been found that a polymeric material consisting essentially of an acrylonitrile polymer and a polymeric 2,2-disubstituted propiolactone can be formed into fibers exhibiting enhanced recovery and strikingly improved modulus when hot and wet, compared with conventional fibers formed in the same manner of unmodified acrylonitrile polymer. The fibers also exhibit good tenacity values, comparable to those of unmodified conventional fibers. Similarly enhanced recovery and modulus are exhibited by films prepared from the novel composition. The novel polymeric material is preferably a blend of an acrylonitrile polymer and a polymeric 2,2-disubstituted propiolactone. In another embodiment of the novel polymeric material the polyester segment consisting essentially of recurring ester structural units derived from a 2,2-disubstituted propiolactone is attached directly to the acrylonitrile polymer molecule. The polyester segments may be grafted as side chains on the acrylonitrile polymer molecule; however, better properties are achieved in the copolymeric form of the composition when the polyester segment is attached to the end of the acrylonitrile polymer molecule to form a block of copolymer.

More specifically, the novel product of the invention is a fiber-forming polymeric material consisting essentially of (I) 3 to 25 mol percent of a polyester component of the formula

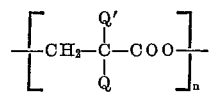

wherein $n$ is an average number of at least 20 and Q and Q' are individually selected from the group consisting of alkyl radicals of 1 to 4 carbons and chlorine-substituted alkyl radicals of 1 to 4 carbons, or Q and Q' together join to form an alicyclic ring, and (II) 75 to 97 mol percent of a fiber-forming addition polymer component selected from the group consisting of acrylonitrile homopolymers and copolymers of acrylonitrile with other ethylenically unsaturated monomers, no less than 75 mol percent of the combined said components (I) and (II) having the formula

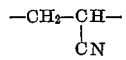

As used herein, "mol percent" values are based on the repeating structural units.

In a preferred embodiment of the invention, the polyester component and the acrylonitrile polymer component are separate molecular species and the composition is a blend of the species. In another embodiment of the invention, the recurring ester structural units of the polyester component are attached to the molecular chain of the acrylonitrile polymer component forming a graft polymer. In still another embodiment, the recurring ester structural units of the polyester component are attached to the terminal structural units of the acrylonitrile polymer component forming a block polymer. A useful solvent for these products is hexafluoroisopropanol.

The invention also comprehends a process for making the products of the present invention, wherein a solution of the acrylonitrile polymer is formed and a 2,2-disubstituted propiolactone is added to the solution and polymerized in the presence of the dissolved acrylonitrile polymer. A suitable solvent in which the process may be carried out is dimethylformamide. In one embodiment of the process, the acrylonitrile polymer has no effective initiator groups and the 2,2-disubstituted propiolactone is polymerized by heating the mixture to form separate polymer molecules blended with the acrylonitrile polymer. If desired, an initator may be added to facilitate the polymerization reaction. In another embodiment of the process, the acrylonitrile polymer is a negatively charged radical which causes the added 2,2-disubstituted propiolactone to commence polymerization as an attachment to the acrylonitrile polymer molecule. The negatively charged radicals may be anionic substituents on the chain, such as sulfonate or carboxylate groups, in which case the resulting product is a graft copolymer. In still another embodiment of the invention, the acrylonitrile polymer is formed by anionic polymerization and the 2,2-disubstituted propiolactone is added to the polymerization mixture after the acrylonitrile polymer has been formed and while the polymer still carries a negative charge on a terminal carbon atom, in which case the resulting product is a block polymer.

As used herein, the term "acrylonitrile polymer" includes both the homopolymer, polyacrylonitrile, and copolymers thereof derived from acrylonitrile together with minor amounts of one or more other unsaturated organic compounds copolymerizable with acrylonitrile. Such compounds include acrylate esters such as methyl acrylate, methacrylate esters such as methyl methacrylate, esters of α-chloroacrylic acid such as methyl α-chloroacrylate, acrylamide, methacrylamide, methyl vinyl ketone, phenyl vinyl ketone, vinyl acetate, vinyl benzoate, and the like. The dyeability of the polymer can be enhanced by the addition of an anionic modifier such as sodium or potassium p-vinylbenzenesulfonate, preferably as a terpolymeric component as disclosed and claimed by Millhiser in his U.S. Patent 2,837,501.

The 2,2-disubstituted propiolactones which may be employed in accordance with the present invention consist essentially of those given by the formula:

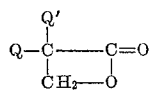

Typical 2,2-disubstituted propiolactones include 2,2-dimethylpropiolactone (pivalolactone) (Q=Q'=CH$_3$), 2,2-diethylpropiolactone (Q=Q'=CH$_2$CH$_3$), 2-methyl-2-chloromethylpropiolactone (Q=CH$_3$, Q'=ClCH$_2$), 2,2-bis(chloromethyl)propiolactone (Q = Q' = ClCH$_2$), 2-methyl-2-ethylpropiolactone (Q=CH$_3$, Q'=CH$_2$CH$_3$), 2,2-dipropylpropiolactone (Q=Q'=CH$_2$CH$_2$CH$_3$), 2,2-dibutylpropiolactone (Q=Q'=CH$_2$CH$_2$CH$_2$CH$_3$), and 2,2-pentamethylenepropiolactone (Q+Q'=CH$_2$CH$_2$CH$_2$CH$_2$-CH$_2$). Such propiolactones may be used individually or in combination to make up to the required percentage of ester structural units in the polymeric material.

The following examples will serve to illustrate the present invention. The following terms and abbreviations are used in the examples: Fiber properties of tenacity, elongation, and initial modulus are reported in their conventional units of g./den., percent, and g./den., respectively. The terms work recovery and tensile recovery are reported in percent. These terms are used as defined in R. G. Beaman and F. B. Cramer, J. Polymer Sci., vol. 21, 228 (1956). Work recovery and tensile recovery values in the examples are reported not only for the dry, room-temperature fibers but also for wet fibers at 50° C., corresponding to the typical condition of the fibers during laundering.

The expression "inherent viscosity," $\eta_{inh}$, as used in the examples, is defined as $$\frac{\ln \eta_{rel}}{c}$$

wherein $c$ is the concentration of the polymer in 100 ml. of the solvent and $\eta_{rel}$ is the symbol for relative viscosity (the ratio of the flow time of the polymer solution relative to the flow time of the solvent). The viscosity measurements are made in 0.5% solutions of the polymer in dimethylformamide (DMF) at 30° C.

In the following examples, parts and percentages are by weight unless otherwise indicated.

The first series of examples illustrate the preparation of a fiber-forming polymer blend consisting essentially of (I) 3 to 25 mol percent of a polyester compound of the formula:

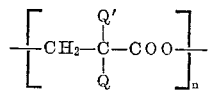

wherein $n$ is an average number of at least 20 and Q and Q' are individually selected from the group consisting of alkyl radicals of 1 to 4 carbons and chlorine-substituted alkyl radicals of 1 to 4 carbons, or Q and Q' together join to form an alicyclic ring, and (II) 75 to 97 mol percent of a fiber-forming addition polymer component selected from the group consisting of acrylonitrile homopolymers and copolymers of acrylonitrile with other ethylenically unsaturated monomers, no less than 75 mol percent of the combined said components (I) and (II) having the formula

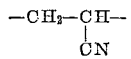

EXAMPLE 1

Preparation of blends of acrylonitrile polymer with polypivalolactone

To 240 g. of dimethylformamide is added 60 g. (1.13 mols, based on the weight of the repeating unit) of polyacrylonitrile having an inherent viscosity of 1.96. The mixture is warmed and heated to complete solution of the polymer, after which it is allowed to cool to room temperature. To this solution is added 6.0 g. of pivalolactone (0.06 mols), following which the mixture is centrifuged for five minutes to remove bubbles, transferred to a spinning cell, heated to 103° C., and extruded at a pressure of 7.73 kg./cm.$^2$ (110 p.s.i.) through a spinneret containing 10 orifices, each 0.165 mm. (6.5 mils) in diameter. The total solutes in the spinning solution amount to 21.5%. Nitrogen at a temperature of 200° C. is passed vertically downward through the spinning cell. The yarn is wound up at 137 meters/min. (150 y.m.n.), washed with cold water to extract residual dimethylformamide, and dried in air. The composition of the fibers is determined from analysis for carbon, hydrogen, and nitrogen: the analysis indicating that the fiber is composed of 96 mol percent polyacrylonitrile and 4 mol percent polypivalolactone, apparently as a blend resulting from thermal polymerization of the pivalolactone in the spinning cell.

The fibers are drawn 5.0× through steam at 0.8433 kg./cm.$^2$ (12 p.s.i.) gauge and relaxed 10% at 190° C. The fiber denier is 1.8 per filament. The properties of these fibers are shown on Table I.

By contrast, control fibers of unmodified polyacrylonitrile spun in the same manner and drawn 5.5× at 180° C. are prepared. The properties of these fibers are also shown in Table I and are coded as Example 1–C.

EXAMPLE 2

Preparation of blends of acrylonitrile polymer with polypivalolactone

Tetrabutylammonium hydroxide (1 ml.) in methanol is neutralized with 0.122 g. of benzoic acid and added to 200 ml. of γ-butyrolactone. Fifty g. of acrylonitrile polymer is added and dissolved at 130° C. A solution of 25 g. (21 mol percent) of pivalolactone and 20 ml. of γ-butyrolactone is added to the reaction mixture at 110° C. After one hour, the gel is transferred to a spinning cell and spun, after which the fibers are drawn 8× at 145° C. and relaxed 14% at 140–145° C. The properties of these fibers are shown in Table I.

EXAMPLE 3

Preparation of blends of acrylonitrile polymer with polypivalolactone

Tetrabutylammonium hydroxide (1 ml.) in methanol is added to 225 ml. of N-methylpyrrolidone. Fifty g. of acrylonitrile polymer is added and dissolved at 76° C. A solution of 10.3 g. (10 mol percent) of pivalolactone in 20 ml. of γ-butyrolactone is added to the reaction mixture in the form of a fine spray. After two hours the gel is transferred to a spinning cell and spun, after which the fibers are drawn 13.5× at 140° C. The properties of these fibers are shown in Table I.

EXAMPLE 4

Preparation of blends of acrylonitrile polymer with poly(2,2-diethylpropiolactone)

Following the procedure of Example 3, in another experiment, the pivalolactone is replaced by 21 g. (15 mol percent) of 2,2-diethylpropiolactone. Fibers are spun and drawn 8.0× at 135° C. The properties of these fibers are shown in Table I.

EXAMPLE 5

Preparation of blends of acrylonitrile, methyl acrylate and sodium p-vinylbenzenesulfonate polymers with polypivalolactone The procedure of Example 1 is repeated, using 70 g. of an acrylonitrile copolymer having an inherent viscosity of 1.5 and comprising 96 mol percent acrylonitrile, 3.8 mol percent methyl acrylate, and 0.2 mol percent sodium p-vinylbenzene sulfonate dissolved in 200 g. of dimethylformamide, to which is added 70 g. of pivalolactone. The total solutes in the mixture amount to 41%. After the mixture is centrifuged and transferred to the spinning cell, the solution is heated to 110° C. and extruded at a pressure 35.2 kg./cm.$^2$ (500 p.s.i.) gauge through a spinneret containing 10 orifices, each 0.165 mm. (6.5 mils) in diameter. The nitrogen at the spinning cell has a temperature of 145° C. The yarn is wound up at 91.4 meters/min. (100 y.p.m.), washed with cold water to extract residual dimethylformamide, and dried in air. The composition of the fibers is determined from analysis for carbon, hydrogen, and nitrogen: The analysis indicating that the fiber is composed of 84 mol percent polymerized acrylonitrile, 3.3 mol percent polymerized methyl acrylate, 0.2 mol percent polymerized p-vinylbenzenesulfonic acid, and 12.5 mol percent polymerized pivalolactone, apparently formed as a blend of the original acrylonitrile copolymer with polypivalolactone resulting from the thermal polymerization of the pivalolactone in the spinning cell.

The fibers are drawn 5.0× over a hot plate maintained at 150° C. The fiber denier is 1.6 per filament. The properties of these fibers are shown in Table I.

By contrast, control fibers of the same acrylonitrile copolymer to which no pivalolactone is added, spun in the same manner and drawn 5.0× through steam at 1.27 kg./cm.$^2$ (18 p.s.i.) gauge and relaxed 14% at 175° C. are prepared. The properties of these fibers are also shown in Table I and are coded as Example 5-C.

less than 75 mol percent of the combined said components (I) and (II) having the formula $$-CH_2-CH- \atop | \atop CN$$

In the block copolymer at least one end of the polyester component is attached to the terminal group of the acrylonitrile polymer.

EXAMPLE 6

Preparation of block copolymers of acrylonitrile and pivalolactone

A 4-necked, round-bottom flask equipped with a nitrogen inlet, a thermometer, a stirrer, and a drying tube exchangeable with a dropping funnel is flamed to ensure that the apparatus is dry. After starting a continuous stream of dry nitrogen gas into the flask, 42.0 g. (0.8 mol) of acrylonitrile and 300 g. of dimethylformamide are added, each previously vacuum distilled from $P_2O_5$ to ensure dryness. The flask is cooled to −40° C. by external application of an acetone-Dry Ice bath, after which 1 ml. of a saturated (0.7%) solution of sodium cyanide in dimethylformamide is added to the flask through a rubber septum using a hypodermic syringe. The mixture is stirred continuously. The temperature rises rapidly, but with the aid of the external cooling is not permitted to rise above about 30° C. With continued external cooling, the temperature drops to about 10-20° C. as the solution becomes more viscous, whereupon 20.0 grams (0.2 mol) of pure pivalolactone is introduced into the flask through a dropping funnel. A rapid further increase in the viscosity of the solution is noted. When the viscosity of the solution appears to reach a constant value, it is centrifuged. The solution, which contains 17.2% solids is then transferred to a dry spinning cell.

The solution is extruded at 135° C. and 45.7 kg./cm.$^2$ (650 p.s.i.) gauge through a spinneret containing ten orifices, each 0.165 mm. (6.5 mils) in diameter, into

TABLE I.—PROPERTIES OF FIBERS OF BLENDED POLYMERS

| Example | Draw Ratio | Percent Relaxation | Modulus, g.p.d. 90° C. Wet/ R.T. Dry [1] | Work Recovery, g.p.d. (3% Elongation) 50° C. Wet/R.T. Dry | Tensile Recovery, g.p.d. (3% Elongation) 50° C. Wet/R.T. Dry | Tenacity, g.p.d. Elongation percent (R.T. Dry) |
|---|---|---|---|---|---|---|
| 1 | 5.0 | 10 | 7.5/67 | 25/23 | 45/50 | 3.7/25 |
| 1-C | 5.5 | 12 | 4.3/79 | 19/20 | 46/46 | 4.4/23 |
| 2 | 8.0 | 14 | 8.5/64 | 27/30 | 51/58 | 3.5/20 |
| 3 | 13.5 | 0 | 8.9/87 | 30/28 | 53/53 | 6.0/19 |
| 4 | 8.0 | 10 | 6.2/58 | | | 4.7/22 |
| 5 | 5.0 | 0 | 2.9/69 | 18/22 | 36/47 | 4.1/22 |
| 5-C | 5.0 | 14 | 1.2/66 | 11/18 | 28/44 | 3.5/37 |

[1] R.T. Dry=Room temperature (21° C.), Dry Sample (in equilibrium with air at 65% relative humidity).

The second series of examples refers to a product in the form of a fiber-forming block copolymer consisting essentially of (I) 3 to 25 mol percent of a polyester component of the formula:

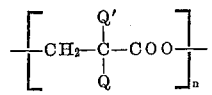

wherein $n$ is an average number of at least 20 and Q and Q' are individually selected from the group consisting of alkyl radicals of 1 to 4 carbons and chlorine-substituted alkyl radicals of 1 to 4 carbons, or Q and Q' together join to form an alicyclic ring, and (II) 75 to 97 mol percent of a fiber-forming addition polymer component selected from the group consisting of acrylonitrile homopolymers and copolymers of acrylonitrile with other ethylenically unsaturated monomers, no a stream of nitrogen passed vertically downward at the rate of 0.17 cu. meter/min. (6 cu. ft./min.) having a temperature of 175° C. at the bottom of the cell and 165° C. at the top of the cell. The yarn is wound up at 91.4 meters/min. (100 y.p.m.), washed with cold water to extract residual dimethylformamide, and dried in air. The polymeric composition of the fibers, theoretically 80 mol percent/20 mol percent polyacrylonitrile/polypivalolactone, is determined by analysis for nitrogen to have an actual value of 77 mol percent/23 mol percent. Samples of the fibers are then drawn over a 180° C. hot plate at various draw ratios as indicated in Table II, following which they are relaxed at 180-185° C.

The properties of the fibers are listed in Table II, together with the properties of a control fiber of acrylonitrile polymer containing no polypivalolactone modifier designated as Example 6-C. Also shown are results obtained for fibers prepared by changing the proportion of reagents, using 48.2 g. (0.9 mol) of acrylonitrile and 10.0 g. (0.1 mol) of pivalolactone designated as Example 7. The spinning solution, which contains 16.2% solids, is spun at 130° C. and 22.8 kg./cm.² (325 p.s.i.) gauge through a spinneret containing 5 orifices, each 0.13 mm. (5 mils) in diameter. The nitrogen is introduced into the cell at a rate of 0.141 cubic meter/min. (5 cu. ft./min.) and a temperature of 175° C. at the bottom of the cell and 155° C. at the top of the cell. The windup speed is 94.1 meters/min. (103 y.p.m.). The polymeric composition of the fibers, nominally 90 mol percent/10 mol percent polyacrylonitrile/polypivalolactone, is determined by analysis for nitrogen to have an actual value of 84 mol percent/16 mol percent.

EXAMPLE 8

Preparation of block copolymers of acrylonitrile, pivalolactone, 2,2-diethylpropiolactone The general procedure of Example 6 for the preparation of 90 mol percent/10 mol percent polyacrylonitrile/polypivalolactone is repeated, except that one-fourth of the pivalolactone is replaced by 2,2-diethylpropiolactone to alter the composition to 90 mol percent/7.5 mol percent/2.5 mol percent polyacrylonitrile/polypivalolactone/poly(2,2-diethylpropiolactone). The resulting block copolymer is spun and the fibers are drawn 6.0× without subsequent relaxation. The properties of these fibers are shown in Table II.

In a similar experiment, another block copolymer is prepared following the above procedure, except that three-fourths of the pivalolactone is replaced by 2,2-diethylpropiolactone so that the resulting copolymer has the composition 90 mol percent/2.5 mol percent/7.5 mol percent polyacrylonitrile/polypivalolactone/poly(2,2-diethylpropiolactone). The resulting block copolymer is spun and the fibers are drawn 4.0× at 170–175° C. and relaxed 7% at 180° C. The properties of these fibers are shown in Table II and designated as Example 9.

wherein $n$ is an average number of at least 20 and $Q$ and $Q'$ are individually selected from the group consisting of alkyl radicals of 1 to 4 carbons and chlorine-substituted alkyl radicals of 1 to 4 carbons, or $Q$ and $Q'$ together join to form an alicyclic ring, and (II) 75 to 97 mol percent of a fiber-forming addition polymer component of copolymers of acrylonitrile with other ethylenically unsaturated monomers, no less than 75 mol percent of the combined said components (I) and (II) having the formula $$-CH_2-CH-\\ \phantom{-CH_2-}CN$$

and wherein at least one of said monomers when polymerized is a trivalent structural unit being connected by two valences within the polymeric chain of said component II and by the third valence to said component (I).

EXAMPLE 10

Preparation of graft copolymers of pivalolactone with acrylonitrile, methyl acrylate, and sodium p-vinylbenzenesulfonate A copolymer comprising 96 mol percent acrylonitrile, 3.8 mol percent methyl acrylate, and 0.2 mol percent sodium p-vinylbenzenesulfonate, prepared as described by F. R. Millhiser in his U.S. Patent 2,837,501, is slurred in dilute hydrochloric acid and then washed with water, after which the copolymer is dried. One hundred and forty (140) ml. of dimethylformamide is cooled to −40° C., and to this is first added 0.2 ml. of a 1 M tetrabutyl ammonium hydroxide solution in methanol followed by 50.0 g. of the dried copolymer. The resulting mixture is allowed to warm to about 30° to 40° C., at which point complete solution occurs. To this is added a mixture of 17 g. of pivalolactone and 50 ml. of dimethylformamide through a syringe, while the polymer solution is vigorously stirred. Polymerization of the lactone commences. After 5 minutes, the solution is centrifuged and

TABLE II.—PROPERTIES OF FIBERS OF BLOCK COPOLYMERS

| Example | Draw Ratio | Percent Relaxation | Modulus, g.p.d. 90° C. Wet/ R.T. Dry [1] | Work Recovery, g.p.d. (3% Elongation) 50° C. Wet/R.T. Dry | Tensile Recovery, g.p.d. (3% Elongation) 50° C. Wet/R.T. Dry | Tenacity, g.p.d. Elongation percent (R.T. Dry) |
|---|---|---|---|---|---|---|
| 6-C | 5.5 | 12 | 4.3/79 | 19/20 | 46/46 | 4.4/23 |
| 6 | 6.6 | 12 | 14/71 | 28/32 | 52/60 | 4.4/17 |
| 6 | 6.0 | 14 | 12/64 | 26/33 | 53/63 | 3.5/22 |
| 6 | 5.0 | 12 | 12/69 | 28/28 | 55/58 | 3.4/22 |
| 6 | 4.0 | 14 | 9/52 | 24/30 | 51/60 | 2.4/28 |
| 7 | 6.0 | 8 | 12/65 | 25/27 | 51/53 | 4.4/21 |
| 7 | 4.2 | 8 | 9.4/46 | 25/30 | 53/56 | 3.3/25 |
| 8 | 6.0 | 0 | 13/100 | 30/26 | 51/51 | 6.3/16 |
| 9 | 4.0 | 7 | 5.5/64 | 23/21 | 38/47 | 2.5/23 |

[1] R.T. Dry = Room temperature (21° C.), Dry Sample (in equilibrium with air at 65% relative humidity).

In another experiment polyacrylonitrile/polypivalolactone block copolymer having a theoretical 80 mol percent/20 mol percent composition is prepared. After the reaction mixture has been stirred for three hours, a film is cast. By analysis for nitrogen the actual composition of the block copolymer is 78 mol percent/22 mol percent polyacrylonitrile/polypivalolactone. Strips of film 50 mm. x 1.6 mm. (2″ x 1/16″) are cut and drawn 6× over a 160° C. hot plate. The average drawn denier is 15. The drawn film is tough and flexible. It has a modulus of 19 g.p.d. at 90° C. when wet, while the dry film at room temperature has a modulus of 64 g.p.d. The tenacity and elongation of the dry film are 3.0 g.p.d. and 9% respectively.

In the third series of examples the product formed is a fiber-forming graft polymer consisting essentially of
 (I) 3 to 25 mol percent of a polyester component of the formula

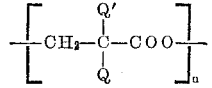

transferred to the spinning cell. The solution contains 25% solids.

The solution is extruded at 85–87° C. and a pressure ranging from 42–72 kg./cm.² (600–1050 p.s.i.) gauge through a spinneret containing 10 orifices, each 0.13 mm. (5 mils) in diameter, into a stream of nitrogen having a temperature of about 186° C. passed vertically downward in the spinning cell. The yarn is wound up at 68 meters/min. (74 y.p.m.), washed with cold water to extract residual dimethylformamide, and dried in air. The composition of the fibers is 17.9 mol percent polymerized pivalolactone, 78.8 mol percent polymerized acrylonitrile, 3.1 mol percent polymerized methyl acrylate, and 0.2 mol percent polymerized p-vinylbenzenesulfonic acid. The fibers are then drawn, in two stages, 2× in water at 72° C. and 3× over a hot plate at 170° C. The properties of these fibers are shown in Table III.

A control fiber composed of a copolymer of 96 mol percent acrylonitrile, 3.8% methylacrylate, and 0.2 mol percent sodium p-vinylbenzenesulfonate drawn 5.0× through steam at 1.27 kg./cm.² (18.2 p.s.i.) gauge is also shown in Table III and is designated as Example 10–C.

EXAMPLE 11

Preparation of graft copolymers of pivalolactone with acrylonitrile/acrylic acid polymer Two liters of water is degassed with nitrogen and heated at 50° C. Two hundred g. of acrylonitrile and 2.7 g. of acrylic acid (100:1 molar ratio) are added and the pH of the solution is adjusted to the range of 3–3.5 using 1.0 N sulfuric acid. To this mixture are quickly added, in the order named, previously prepared quantities of 5 mg. of ferrous ammonium sulfate hexahydrate, 0.5 g. of potassium persulfate in 100 ml. of water and 2.5 of sodium metabisulfite in 250 ml. of water. The reaction mixture, which becomes cloudy within a short time, is stirred quite slowly for one hour. The polymer is filtered off, washed with water, washed with acetone, and dried in a vacuum oven.

Fifty g. of acrylonitrile/acrylic acid copolymer, prepared as described above, is mixed with 225 ml. of dimethylformamide at room temperature. The mixture is stirred vigorously to dissolve the copolymer and then, as stirring is continued, 12.9 g. (12 mol percent) of pivalolactone in 20 ml. of γ-butyrolactone is added dropwise over a period of time. The mixture is transferred to a spinning cell and heated at 86° C. for two hours to permit completion of polymerization, following which the resulting gel is spun at 100° C. The fibers are drawn at 150° C. 5× and then relaxed 14% at 150° C. The properties of these fibers are shown in Table III.

In a similar experiment using an acrylonitrile/acrylic acid copolymer (mol ratio 1000/1) the amount of pivalolactone added is reduced to 4.4 g. (4 mol percent), and the fibers spun from the copolymer are drawn 4× at 155° C. and relaxed 10% at 175° C. The properties of these fibers are shown in Table III designated as Example 12.

EXAMPLE 13

Preparation of graft copolymers of 2,2-diethylpropiolactone with acrylonitrile/acrylic acid polymer The experiment as shown in Example 11 is repeated again, employing 186 ml. of dimethylformamide as solvent, 38.8 of acrylonitrile/acrylic acid copolymer (mol ratio 100/1) and 12.8 g. of 2,2-diethylpropiolactone (12 mol percent) in place of the pivalolactone. Fibers are spun from the resulting graft copolymer, and the spun fibers are drawn 5× at 175° C. and relaxed 14% at 180° C. The properties of these fibers are shown in Table III.

tone. These unexpectedly higher modulus values of the fibers under hot-wet conditions are important because fibers and fabrics are frequently processed under these conditions. Significantly this improvement is obtained without undesirable effect on the other important fiber properties listed, i.e., work recovery, tensile recovery tenacity, and elongation. Because of this improved property, the fibers of the polymeric materials of the present invention are highly useful in the typical applications of textile fibers. Utility is also present in improved films formed of these polymeric materials.

The polymeric material of the present invention can contain conventional additives such as stabilizers, antioxidants, delusterants, pigments, dyes, antistatic agents, and the like. Other aspects of this invention will be obvious to those skilled in the art.

It is to be understood that the foregoing description is by way of example only and that various modifications and changes in the details may be made without departing from the spirit of the invention and the scope of the following claims.

What is claimed is:

1. A fiber-forming polymeric material consisting essentially of a physical mixture of
 (I) 3 to 25 mol percent of a polyester component of the formula

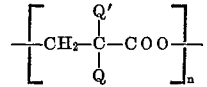

wherein $n$ is an average number of at least 20 and Q and Q′ are individually selected from the group consisting of alkyl radicals of 1 to 4 carbons and chlorine-substituted alkyl radicals of 1 to 4 carbons, or Q and Q′ together join to form an alicyclic ring, and
 (II) 75 to 97 mol percent of a fiber-forming addition polymer component selected from the group consisting of acrylonitrile homopolymers and copolymers of acrylonitrile with at least one other ethylenically unsaturated monomer no less than 75 mol percent of the combined said components (I) and (II) having the formula

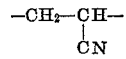

2. The polymeric material of claim 1 wherein said component (I) is polymerized 2,2-dimethylpropiolactone.

3. The polymeric material of claim 1 wherein said component (I) is polymerized 2,2-diethylpropiolactone.

TABLE III.—PROPERTIES OF FIBERS OF GRAFT COPOLYMERS

| Example | Draw Ratio | Percent Relaxation | Modulus, g.p.d. 90° C. Wet/ R.T. Dry [1] | Work Recovery, g.p.d. (3% Elongation) 50° C. Wet/R.T. Dry | Tensile Recovery, g.p.d. (3% Elongation) 50° C. Wet/R.T. Dry | Tenacity, g.p.d. Elongation percent (R.T. Dry) |
|---|---|---|---|---|---|---|
| 10 | 6.0 | 0 | 7.8/55 | 24/30 | 50/58 | 2.0/14 |
| 10–C | 5.0 | 14 | 1.2/66 | 11/18 | 28/44 | 3.5/37 |
| 11 | 5.0 | 0 | 5.2/71 | 24/28 | 42/50 | 3.4/29 |
| 12 | 4.0 | 10 | 5.2/63 | 18/26 | 39/51 | 2.8/32 |
| 13 | 5.0 | 14 | 5.4/67 | 26/26 | 50/55 | 3.2/32 |

[1] R.T. Dry=Room temperature (21° C.), Dry sample (in equilibrium with air at 65% relative humidity).

The amount of the trivalent structural unit required for producing a graft polymer may be very small in some circumstances. It appears that the minimum concentration of these trivalent linking units is equal to $1/n$ of the mol percent of the polyester component (wherein "$n$" is as previously defined).

As is seen from Tables I, II, and III, fibers of the polymeric materials of the present invention have a greatly improved modulus at hot-wet conditions when compared with the corresponding acrylonitrile polymer fibers not containing polymerized 2,2-disubstituted propiolac- 4. The polymeric material of claim 1 wherein said component (I) is polymerized 2,2-dimethylpropiolactone and 2,2-diethylpropiolactone.

5. The polymeric material of claim 1 wherein said component (II) is acrylonitrile homopolymer.

6. The polymeric material of claim 1 wherein said component (II) is the copolymer of acrylonitrile and methyl acrylate.

7. The process of forming the physical mixture of polymeric material of claim 1, comprising:

(1) forming said component (II) having no effective initiator groups on the polymer chain,
(2) dissolving said component (II) in a suitable solvent,
(3) adding the 2,2-disubstituted propiolactone, which can be polymerized, to form the desired said component (I), to the solution of component (II), and
(4) polymerizing said 2,2-disubstituted propiolactone to form said component (I) existing as a blend with said component (II).

References Cited
UNITED STATES PATENTS

| | | | |
|---|---|---|---|
| 2,575,006 | 11/1951 | Coover | 260—898 |
| 2,851,435 | 9/1958 | Pirot | 260—898 |
| 3,021,310 | 2/1962 | Cox et al. | 260—873 |
| 3,305,605 | 2/1967 | Hostettler et al. | 260—873 |

MURRAY TILLMAN, *Primary Examiner.*

J. T. GOOLKASIAN, *Assistant Examiner.*